April 26, 1932.  W. W. ODELL  1,855,309

WATER GAS GENERATOR

Filed Aug. 24, 1925

INVENTOR.

William W. Odell

Patented Apr. 26, 1932

1,855,309

UNITED STATES PATENT OFFICE

WILLIAM W. ODELL, OF SAN FRANCISCO, CALIFORNIA

WATER GAS GENERATOR

Application filed August 24, 1925. Serial No. 52,066.

This application relates to a gas generating apparatus, or generator, and a process for manufacturing combustible gas chiefly from solid fuel, but more specifically it relates to an internal attachment to said gas generator whereby the fuel is guided and spread as it is charged into the generator and maintained in a free and loose condition in the generator fuel-bed.

The objects of this invention are:

(1) To spread the fuel as charged into a generator for producing combustible gas, (2) To afford an easy passage of the gas through the generator fuel mass other than along the generator wall, (3) To provide a loose non-packed fuel-bed particularly in the middle portion of the generator, (4) To eliminate the necessity of making so large a percentage of down steam runs as is now necessary when using coal as generator fuel making water gas, (5) To increase the capacity of a gas generator, (6) To provide a means for heating the upper portion of the generator fuel bed, (7) To minimize the difficulties with side wall clinkers, (8) To increase the efficiency of gasification, (9) To decrease radiation losses, and

(10) To make better gas in the water gas process.

In the ordinary operation of a gas generator, particularly a water gas generator, there is a pronounced tendency for the gases to pass largely through the fuel along the wall rather than through the middle of the mass making the outer wall very hot during air blasting and leaving the inner portion of the fuel bed relatively cool particularly in the upper portion. In other words the heat gradient vertically through the fuel-bed is not the same along the walls as through the center of the fuel mass. Furthermore the fuel which is usually charged through an upper door centrally located in the top of the generator packs in the middle where the fires usually accumulate because the lumps roll down toward the outer wall. These two things in particular I avoid in the use of my generator.

Figure 1:
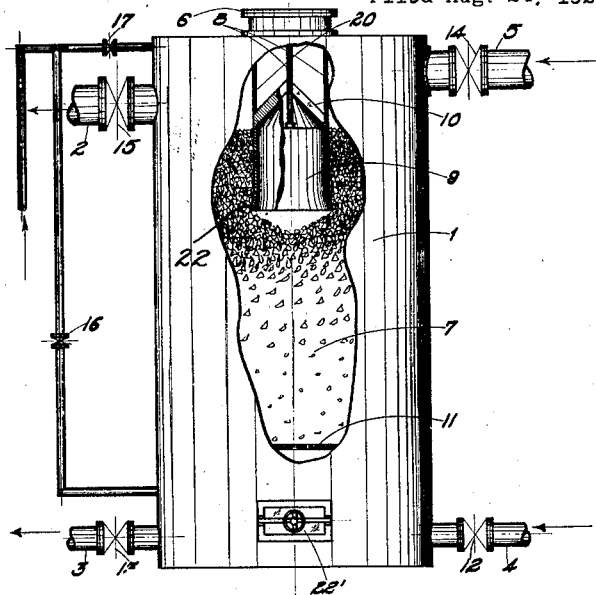
Figure 1 is an elevation of the generator with a portion of the wall cut away to show the interior sections.

In Figure 1, 1 is the gas generator shell, with gas offtakes 2 and 3 and air blast inlets at 4 and 5. While 6 is the fuel-charging door, 7 the fuel mass, 8 is a means of suspending the deflecting element 9 having a cone top 10, which latter may be entirely within the fuel mass or may project above it. Member 9 has a lower flared portion 22. The grate bars are shown at 11. Valves in the air blast lines are shown at 12 and 14 and valves in the gas offtakes are shown at 13 and 15. The steam valves shown at 16 and 17 control the admission of steam respectively for the up and down steam runs. The ash cleaning door is shown at $22^1$.

Figure 2:
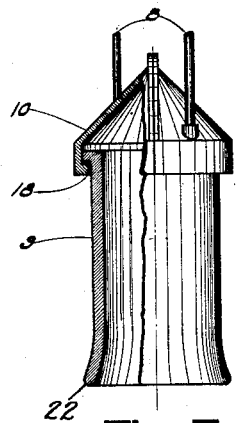
Figure 2 is an elevation of the suspended element with a portion cut away showing the joints, gasket and walls in section. The suspension bars are suitably attached to the upper portion of the generator when installed therein; only the lower portions of them are shown.

In Figure 2, the same numbers refer to the same parts as in Figure 1. Thus 9 is the suspended element, 10 the cone top, 8 the suspension bars, and 18 is the gasket whereby the element 9 is cushion suspended.

Figure 3:
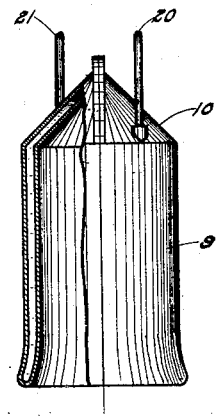
Figure 3 is an elevation of a modification of the suspended element with a portion cut away to show the interior in section, and shows a means for cooling the element with a cooling fluid; here the element may be one piece.

In Figure 3, 9 is the suspended element and as shown consists of substantially one piece; it is jacketed and has an inlet and outlet for a cooling fluid at 20 and 21.

All of element 9 may be flared outwardly and downwardly. The flaring outwardly downwardly in a substantially cylindrical generator causes a partial constriction at this zone of the fuel bed thus causing the formation of a dense fuel bed adjacent said element and a less dense bed beneath it. Obviously the flaring of the suspended element prevents the fuel from passing too rapidly downwardly in the middle of the generator.

In the operation of my generator in the manufacture of water gas I proceed as follows: The charging door 6 is opened and solid fuel is charged through the opening and a fire is kindled in the fuel mass which is subsequently built up to a level approaching the bottom of the gas offtake 2. The ignited fuel is air-blasted through the inlet 4 and the blast gases pass out through the offtake 2. The element 9 is adjusted or suspended to such a level that the blast gas can travel upwards through the fuel mass through the middle of the fuel-bed as well as along the generator wall.

During up-blasting valves 12 and 15 are open and valves 13, 14, 16 and 17 are shut. When the fuel is sufficiently hot the air blasting is discontinued, valve 12 is closed and valve 16 is opened and an up stream run is made taking the gas off through valve 15. When the fuel has cooled below a good gas making temperature the steam valve 16 is closed and valve 15 is closed and valves 13 and 14 are opened. Air is blasted into the generator through valve 14 and the blast gas is removed through valve 13. The down blasting is continued for a brief period only usually less than a minute depending upon the blast pressure; valve 14 is then closed and air is admitted through 4 by opening valve 12. During this up air blasting, valve 13 is closed and valve 15 is open. When the fuel is almost hot enough for gas-making purposes the blasting into the air is discontinued and the blast gas is conducted into a holder for a brief period then the blasting is discontinued and a steam run is made, either an up-run, down-run or a split-run. It is usually preferable with large gas generators to make split runs but alternate up and down runs are equally as good.

It will be noted that the down-blasting in this generator is not the same as down-blasting in an ordinary generator and the results are different. In the present generator the down air blast heats the middle and central portion of the fuel-bed and the heat stored there is later carried upward to the outer zone in the upper part of the fuel bed adjacent the deflecting element 9. Normally the down blast tends to heat the fuel bed solely along the generator wall in ordinary generators, aggravating the wall clinker condition and increasing radiation. Radiation is minimized with my method of blasting and steam running chiefly because of the open and loose fuel bed maintained by the deflecting element.

The part of the element shown at 9 may be of any length so long as it does not extend to the grates; usually in a generator having a seven-foot fuel-bed I prefer to have it approximately 2½ to 3½ feet long. It may be of any desired diameter but obviously cannot be larger in diameter than the door, when made of one piece. In generators of large diameter it is sometimes preferable to use a multiplicity of small elements suitably placed and suspended and these elements may be pipes made of suitable material or solid bars. I believe this principle to be new and desire to cover it with Letters Patent and therefore use the term "element" in my claims to mean one or more parts extending downward into the fuel mass. The upper portion of the element shown at 9, Figures 1, 2, and 3, may be substantially cylindrical but the lower portion at least should be flared outwardly downwardly at the lower end, as at 22 of Figs. 1 and 2.

The elements may be made of a high-melting-point alloy or the upper portion only may be made of this material and the lower portion of a refractory material such as carborundum, fireclay or the like. Chromium is becoming cheaper as time passes and it will be noted that this and other elements are not so readily acted upon by steam or air as iron and certain other metals; hence it is not too expensive to employ alloys containing a high percentage of chromium or the like as the material for constructing the deflecting elements.

When a combustion of metal and clay or similar refractory is employed in the elements it is decidedly advantageous to cushion suspend the latter so that the shock of the coal during charging will not tend to crack or otherwise damage it. A gasket or other means of absorbing shock is used and the former is shown at 18 in Figure 2. It will be noted that when a down blast is not used in the process described the process appears to be the regular water gas process, but since the results are so different—the capacity is increased because of the higher temperature of the fuel in the upper zones, the radiation loss is minimized, there are no blow holes in the fuel bed and a greater efficiency of conversion is obtained.

In the drawings a cylindrical generator only is shown and therefore the element is shown to harmonize with this shape generator. In oblong or rectangular generators the same principle can be utilized by changing the shape of the element or utilizing a multiplicity of small elements.

In the claims the term "substantially conical" or "shaped substantially like a cone" is intended to include besides a true cone a pyramid or the like since in large generators a many-sided pyramid functions almost identically like a cone, approaching it as the number of sides are increased.

The term "middle of the fuel-bed" is intended to mean the portion of the fuel bed inwardly away from the generator walls; in a cylindrical generator it is substantially a cylindrical core with a diameter usually a foot or two less than the total diameter of the fuel-bed in ordinary size sets; the exact diameter for any particular size set will vary according to the diameter of the suspended element and to the distance it extends downwardly into the fuel bed.

A specimen time cycle of the operation of my process after the generator is in full operation is substantially as follows:

Down air-blast    1    minute (blast gas not recovered)
Up air-blast      1½ minutes (blast gas not recovered)
Up air-blast      ½ minute (blast gas is recovered)
Up and down       4 minutes (a small amount of air is admitted with the steam when so desired)
steam run Total    7    minutes According to the above it is evident that this is a four-stage process. The blast gases produced during the third stage or period are mixed with the generated water gas in a gas holder or the equivalent.

I claim:

1. In a water-gas generator comprising a substantially cylindrical shell adapted to contain a supported bed of ignited fuel, separate connections for the introduction of air and steam into said fuel bed and for the exit of gas from above and from beneath said fuel bed adjacent the top and bottom respectively, a fuel-charging door centrally located in the top, common means for spreading and deflecting said fuel as charged and for providing a ready passage of gas through substantially the middle of the fuel mass, comprising a separate, hollow, double-walled metal element separate from the gas offtakes, rigidly suspended from the top, retained in a stationary position in the upper portion of said fuel bed substantially within the middle thereof, extending upwardly above the top of said fuel bed beneath said fuel-charging door, the upper portion being shaped substantially like an upright cone, the lower portion flaring outwardly and downwardly; said element having means for the passage of a cooling fluid between said double walls, and being adapted to coact with the generator wall in forming the upper portion of said fuel bed only into an annular dense mass and the lower portion into a less dense solid mass with a central portion highly pervious to gas.

2. In combination, in a generator adapted for the manufacture of water gas intermittently in cycles by alternately air-blasting and steaming a bed of ignited fuel, an upright generator shell adapted to confine said bed of ignited fuel having a grate for supporting said fuel bed, means for introducing air from beneath said fuel bed, means for introducing steam from above and from beneath said fuel bed, a fuel-charging door centrally located in the top of said generator, and a stationary, common fuel-spreading and fuel-deflecting element rigidly suspended from the top of said generator beneath said fuel charging door extending downwardly into the middle and upper portion only of said fuel bed from above it, separate from the upper gas offtakes; said fuel-spreading element being substantially a hollow, upright tube open at the bottom and closed at the top, adapted to maintain a highly porous fuel mass centrally located beneath it in the lower and hot zone of said fuel bed.

3. In combination, in a generator for the manufacture of water gas intermittently in cycles by alternately air-blasting and steaming a bed of ignited solid fuel, an upright, cylindrical generator shell adapted to confine said bed of ignited fuel having a grate for supporting said fuel bed, means for introducing air from beneath said fuel bed, means for introducing steam from above and from beneath said fuel bed, a fuel-charging door centrally located in the top of said generator, and a stationary, common fuel-spreading and fuel-deflecting element rigidly suspended from the top of said generator beneath said fuel-charging door extending outward and downwardly from above it into the middle and upper portion only of said fuel bed separate from the gas offtakes; said element comprising substantially a hollow, upright tube open at the bottom having a closed conical top and a vertical axis common to said generator, and being adapted to maintain a highly porous fuel mass centrally located beneath it in the lower and hot zone of said fuel bed.

4. In combination with a cylindrical, vertical shell, water gas generator having a fuel-charging door centrally located in the top, means for supporting an ignited fuel bed therein comprising a horizontal grate continuous within the circumscribing generator-wall, and a fuel-spreading and fuel-deflecting device comprising an upright, hollow, tubular element having a closed substantially conical top and a downwardly and outwardly flaring lower portion, rigidly suspended from the top in a stationary position beneath said fuel-charging door, adapted to extend down into said fuel bed from above it part way only toward said grate; said element being separate from the gas offtakes, substantially symmetrical about the generator-axis, and adapted to extend down into said fuel bed more than 2.5 feet below the top of said bed.

WILLIAM W. ODELL.